US006624826B1

(12) United States Patent
Balabanovic

(10) Patent No.: US 6,624,826 B1
(45) Date of Patent: Sep. 23, 2003

(54) METHOD AND APPARATUS FOR GENERATING VISUAL REPRESENTATIONS FOR AUDIO DOCUMENTS

(75) Inventor: Marko Balabanovic, San Francisco, CA (US)

(73) Assignee: Ricoh Co., Ltd., Tokyo (JP)

(*) Notice: Subject to any disclaimer, the term of this patent is extended or adjusted under 35 U.S.C. 154(b) by 0 days.

(21) Appl. No.: 09/407,010

(22) Filed: Sep. 28, 1999

(51) Int. Cl.[7] ................................................ G06F 3/00
(52) U.S. Cl. .................. 345/727; 345/760; 345/768; 715/512
(58) Field of Search ................... 345/716, 727, 345/728, 730, 760, 764, 768; 707/512; 704/276; 715/512

(56) References Cited

U.S. PATENT DOCUMENTS

| | | | |
|---|---|---|---|
| 5,679,075 A | 10/1997 | Forrest et al. | |
| 5,782,692 A | 7/1998 | Stelovsky | |
| 5,799,280 A | * 8/1998 | Degen et al. | 704/276 |
| 5,983,220 A | 11/1999 | Schmitt | |
| 5,986,660 A | 11/1999 | Sweatt, III | |
| 6,041,335 A | * 3/2000 | Merritt et al. | 707/512 |
| 6,084,590 A | 7/2000 | Robotham et al. | |
| 6,119,147 A | 9/2000 | Toomey et al. | |
| 6,154,771 A | 11/2000 | Rangan et al. | |
| 6,333,753 B1 | * 12/2001 | Hinckley | 345/768 |

OTHER PUBLICATIONS

M. Crossley et al., "Three–Dimensional Internet Developments," BT Technol. J vol. 15 No. 2, Apr. 1997, Published 1997, pp. 179–193.

* cited by examiner

Primary Examiner—Raymond J. Bayerl
Assistant Examiner—Kieu D. Vu
(74) Attorney, Agent, or Firm—Blakely, Sokoloff, Taylor & Zafman LLP

(57) ABSTRACT

A method and apparatus for generating visual representations for audio documents. A dynamically adjustable audio gauge is used to visually represent an audio narration that may optionally describe an electronic document or image displayed upon a display device. By indicating a position on a display screen through clicking, pointing, or touching the display screen, audio recording is initiated and a dynamically adjustable audio gauge is displayed. The audio gauge increases in size in proportion to the amount of audio recorded while the audio gauge is active. Audio recording may cease upon the audio level dropping below a predetermined threshold or may cease in response to specific user input. For each additional positional stimulus received, a new audio gauge is generated and the previous audio gauge ceases to be adjusted, thereby becoming inactive. The audio gauges may include one or more references to various forms of electronic documents and may be used in an electronic messaging scenario.

29 Claims, 11 Drawing Sheets

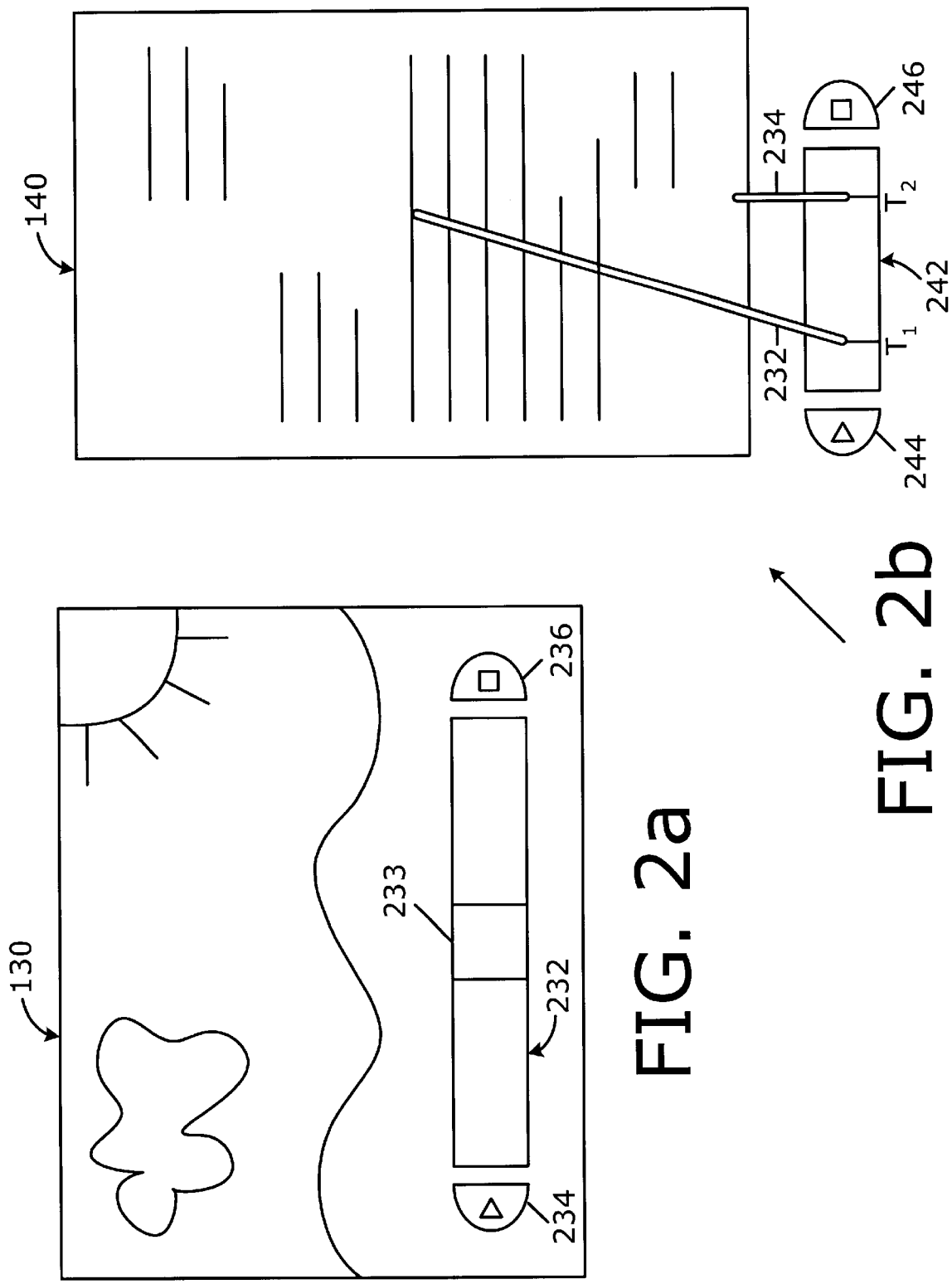

```
<CHRONICLE SAVETIME= "927336993806" AUTHORID="marko">
<SUBCHRONICLE AUTHORID="marko" STARTTIME="927336940440">
<CLIP><AUDIOREFS LENGTH="3240">
<AUDIO SRC="http://Server/Clip1.au"/>
<CLIPREF TIME="1753" REF="http://Server/Doc1"/>
</AUDIOREFS></CLIP>
<CLIP><AUDIOREFS LENGTH="11600">
<AUDIO SRC= "http://Server/Clip2.au"/>
<CLIPREF TIME= "2293" POINTX= "250" POINTY= "750" REF= "http://
Server/Doc2"/>
<CLIPREF TIME= "6259" POINTX= "330" POINTY= "250" REF= "http://
Server/Doc3"/>
</AUDIOREFS></CLIP>
<CLIP><AUDIOREFS LENGTH= "1920">
<AUDIO SRC= "http://Server/Clip3.au"/>
</AUDIOREFS></CLIP>
</SUBCHRONICLE>
<SUBCHRONICLE AUTHORID= "marko" STARTTIME= "927336977200">
<CLIP><AUDIOREFS LENGTH= "6560">
<AUDIO SRC= "http://Server/Clip4.au"/>
<CLIPREF TIME= "4086" REF= "http://Server/Doc4"/>
</AUDIOREFS></CLIP>
</SUBCHRONICLE>
</CHRONICLE>
```

FIG. 3b

METHOD AND APPARATUS FOR GENERATING VISUAL REPRESENTATIONS FOR AUDIO DOCUMENTS

FIELD OF THE INVENTION

The invention relates to the field of authoring of electronic information; more specifically, this invention relates to a method and apparatus for generating visual representations for audio documents.

BACKGROUND OF THE INVENTION

It has been asserted that a large percentage of a typical person's day is spent communicating with others through various mechanisms including oral and written media. Further, there is often a tradeoff between rich, oral communication media and less rich, written communication media. While oral media enable negotiation, clarification, explanation and exchange of subjective views, written media enable the exchange of large amounts of accurate, objective or numeric data.

This dichotomous relationship between oral and written communication similarly exists within the electronic realm. Simple textual email messages, although easy to author, typically do not allow rich, expressive communication as may sometimes be required. On the other hand, tools for creating richer, more expressive messages, such as multimedia presentation software, are too complex and time-consuming for casual or day-to-day use. Furthermore, multimedia presentation software typically is not designed to be used as a communication tool. Multimedia "documents" produced using this software tend to present information to an audience, rather than allow user interaction and self-guided learning.

Therefore, what is needed is a method for creating a simple and effective multimedia authoring tool that overcomes the limitations found within the prior art.

SUMMARY OF THE INVENTION

A method and apparatus for generating multimedia representation on a display device is described. In one embodiment, the method comprises receiving a first positional stimulus indicating a first location upon the display device. Then, the initiation of recording of an audio input stream occurs. A first audio gauge is displayed at the first location upon the display device and is dynamically adjusted to be proportional in size to an amount of audio recorded.

BRIEF DESCRIPTION OF THE DRAWINGS

The invention is illustrated by way of example, and not by way of limitation in the figures of the accompanying drawings in which like reference numerals refer to similar elements.

FIG. 2A illustrates an electronic document in the form of a digital photograph displayed with one embodiment of an associated audio gauge.

FIG. 2B illustrates one embodiment of an audio gauge that includes reference markers.

FIG. 3B illustrates one embodiment of an XML representation for the multimedia chronicle shown in FIG. 3A.

DETAILED DESCRIPTION

Figure 1A:
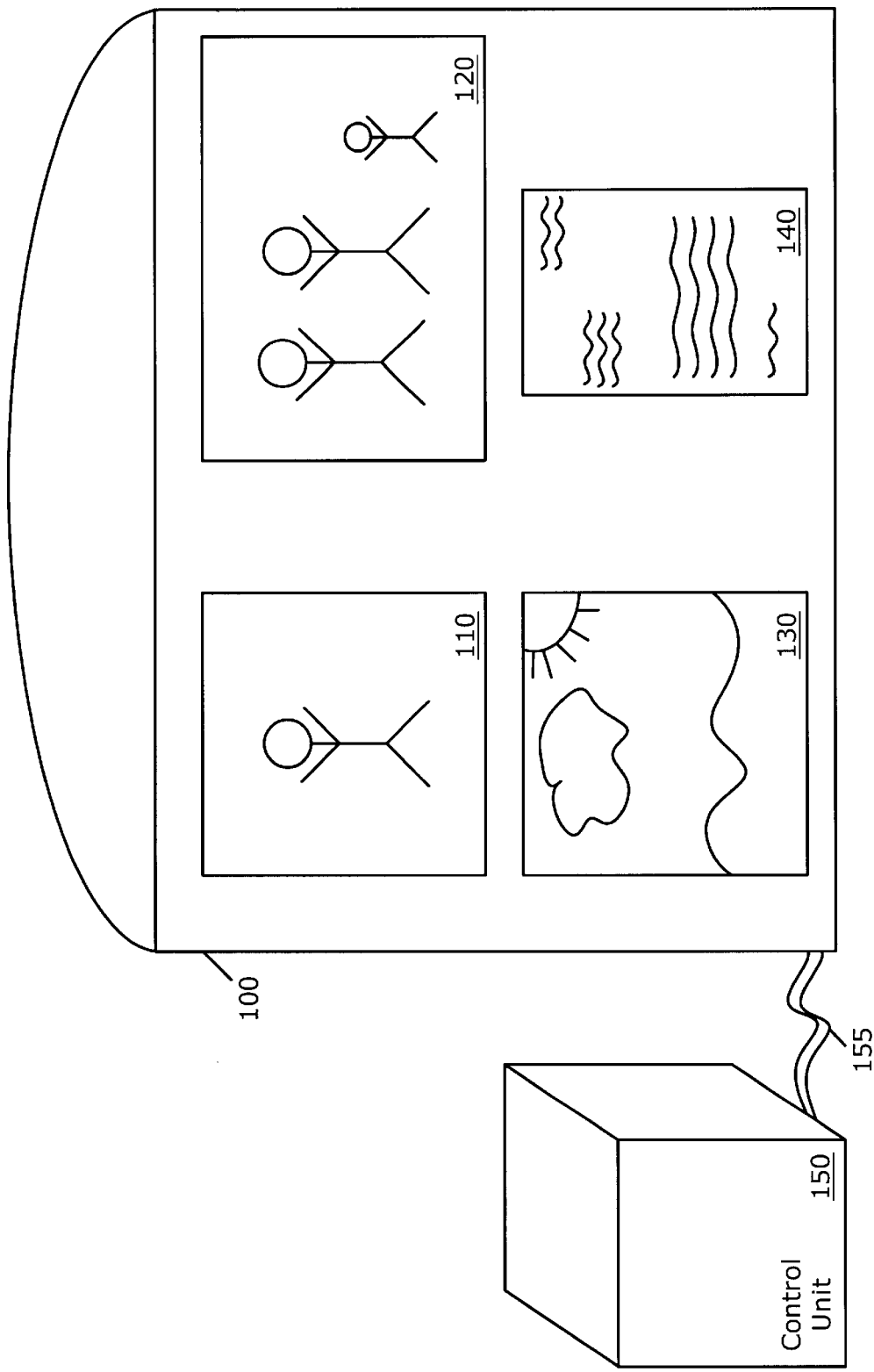
FIG. 1A illustrates an electronic display upon which electronic documents are.

A method and apparatus for generating visual representations for audio documents is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates an electronic display device upon which various electronic documents are displayed. Referring to FIG. 1A, display device 100 may comprise any device equipped to display electronic images and data as described herein. Display device 100 may be, for example, a cathode ray tube (CRT), liquid crystal display (LCD), or any other similarly equipped display device, screen, or monitor. In one embodiment, display device 100 is equipped with a touch screen in which a touch-sensitive, transparent panel covers the screen of display device 100. Additionally, display device 100 is shown coupled to control unit 150 by connector cable 155. Connector cable 155 may be external or internal to display device 100.

Control unit 150 may comprise an arithmetic logic unit, a microprocessor, a general purpose computer, a personal digital assistant or some other information appliance equipped to provide electronic display signals to display device 100. In one embodiment, control unit 150 comprises a general purpose computer having a graphical user interface, which may be generated by, for example, WINDOWS® or JAVA® based operating systems. In one embodiment, electronic documents 110, 120, 130, and 140 are generated by one or more application programs executed by control unit 150 including, without limitation, word processing applications, electronic mail applications, spreadsheet applications, and web browser applications. In one embodiment, the operating system and/or one or more application programs executed by control unit 150 provide "drag-and-drop" functionality where each electronic document, such as electronic documents 110, 120, 130, and 140, may be encapsulated as a separate data object.

Referring still to FIG. 1A, connector cable 155 represents any connector cable known in the art to route display signals from a device such as control unit 150 to a display device such as display device 100. In an alternative embodiment, control unit 150 may be situated within display device 100 and the use of connector cable 155 may not be required or may be internal to display device 100.

Figure 1B:
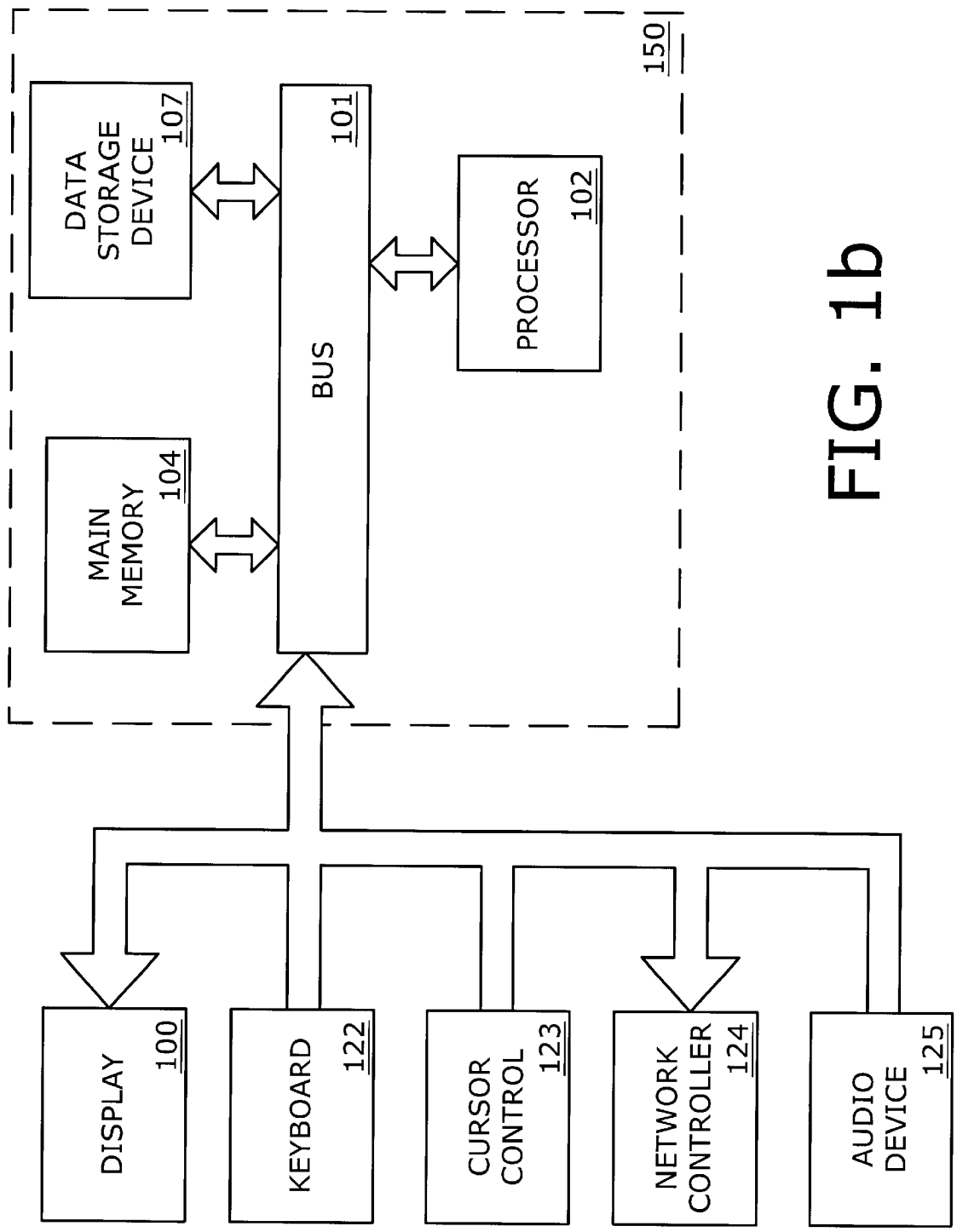
FIG. 1B is a block diagram illustrating one embodiment of a computer system.

FIG. 1B is a block diagram of one embodiment of a computer system. Referring to FIG. 1B, control unit 150 is shown including processor 102, main memory 104, and data storage device 107, all of which are communicatively coupled to system bus 101.

Processor 102 processes data signals and may comprise various computing architectures including a complex instruction set computer (CISC) architecture, a reduced instruction set computer (RISC) architecture, or an architecture implementing a combination of instruction sets. Although only a single processor is shown in FIG. 1B, multiple processors may be included.

Main memory 104 may store instructions and/or data that may be executed by processor 102. The instructions and/or data may comprise code for performing any and/or all of the techniques described herein. Main memory 104 may be a dynamic random access memory (DRAM) device, a static random access memory (SRAM) device, or some other memory device known in the art.

Data storage device 107 stores data and instructions for processor 102 and may comprise one or more devices including a hard disk drive, a floppy disk drive, a CD-ROM device, a DVD-ROM device, a DVD-RAM device, a DVD-RW device, a flash memory device, or some other mass storage device known in the art.

System bus 101 represents a shared bus for communicating information and data throughout control unit 150. System bus 101 may represent one or more buses including an industry standard architecture (ISA) bus, a peripheral component interconnect (PCI) bus, a universal serial bus (USB), or some other bus known in the art to provide similar functionality.

Additional components coupled to control unit 150 through system bus 101 include display device 100, keyboard 122, cursor control device 123, network controller 124 and audio device 125. Display device 100 represents any device equipped to display electronic images and data as described herein. Display device 100 may be a cathode ray tube (CRT), liquid crystal display (LCD), or any other similarly equipped display device, screen, or monitor. Keyboard 122 represents an alphanumeric input device coupled to control unit 150 to communicate information and command selections to processor 102. Cursor control 123 represents a user input device equipped to communicate positional data as well as command selections to processor 102. Cursor control 123 may include a mouse, a trackball, a stylus, a pen, cursor direction keys, or other mechanisms to cause movement of a cursor. Network controller 124 links control unit 150 to a network that may include multiple processing systems. The network of processing systems may comprise a local area network (LAN), a wide area network (WAN) (e.g., the Internet), and/or any other interconnected data path across which multiple devices may communicate.

Audio device 125 is coupled to system bus 101 and is equipped to receive audio input and transmit audio output. Audio input may be received through various devices including a microphone within audio device 125 and network controller 124. Similarly, audio output may originate from various devices including processor 102 and network controller 124. In one embodiment, audio device 125 is a general purpose, audio add-in/expansion card designed for use within a general purpose computer system. Optionally, audio device 125 may contain one or more analog-to-digital or digital-to-analog converters, and/or one or more digital signal processors to facilitate audio processing.

It should be apparent to one skilled in the art that control unit 150 may include more or less components than those shown in FIG. 2 without departing from the spirit and scope of the present invention. For example, control unit 150 may include additional memory, such as, for example, a first or second level cache, or one or more application specific integrated circuits (ASICs). Similarly, additional components may be coupled to control unit 150 including, for example, image scanning devices, digital still or video cameras, or other devices that may or may not be equipped to capture and/or download electronic data to control unit 150.

Audio-Narratives

In accordance with one embodiment, one can record a variable-length audio narration that may optionally describe one or more electronic documents or images displayed upon a display device. In one embodiment, by indicating a position on a display screen through clicking, pointing, or touching the display screen, audio recording is initiated and a dynamically adjustable audio gauge is displayed. The audio gauge increases in size in proportion to the amount of audio recorded while the audio gauge is active. Audio recording may cease when the audio level drops below a predetermined threshold or may cease in response to specific user input. In one embodiment, for each additional positional stimulus received, a new audio gauge is generated and the previous audio gauge ceases to be adjusted, thereby becoming inactive.

The term "positional stimulus," as referred to herein, represents an input which can simultaneously indicate an electronic location on the display screen with an instant in time tracked by the control unit. Various input sources may generate a positional stimulus including, without limitation, a computer mouse, a trackball, a stylus or pen, and cursor control keys. Similarly, a touch screen is capable of both generating and detecting a positional stimulus. In one embodiment, positional stimuli are detected by control unit 150, whereas in another embodiment, positional stimuli are detected by display device 100.

In an exemplary embodiment, once a positional stimulus occurs, such as a "click" of a mouse or a "touch" on a touch screen, an audio gauge is generated on display device 100 at the location indicated by the positional stimulus. At substantially the same time as the audio gauge is generated, control unit 150, or a similarly equipped device coupled to control unit 150, begins to record audio input. In one embodiment, the size of the audio gauge displayed is dynamically adjusted so as to proportionally indicate the amount of audio recorded by control unit 150, or the similarly equipped device coupled to control unit 150. Audio may be recorded by control unit 150 through audio device 125 or similar audio hardware (a software), and the audio may be stored within data storage device 107 or a similarly equipped audio storage device. In one embodiment, control unit 150 initiates audio recording in response to detecting a positional stimulus, whereas in an alternative embodiment, control unit 150 automatically initiates audio recording upon detecting audio input above a predetermined threshold level. In another embodiment, a set of on-screen or physical buttons are used to control recording. Buttons for audio control are well-known and include "Record", "Play", "Stop", "Pause", "Fast Forward", "Rewind". Similarly, audio recording may automatically be terminated upon the audio level dropping below a predetermined threshold or upon control unit 150 detecting a predetermined duration of silence where there is no audio input.

FIG. 2A illustrates an electronic document in the form of a digital photograph displayed with an associated audio gauge. Referring to FIG. 2A, electronic document 130 is shown on display device 100. In an alternative embodiment, electronic document 130 may appear as a reduced size "thumbnail" representation of a larger image or document.

In one embodiment, audio gauge 232 is displayed overlayed upon electronic document 130 and includes start indicator 234 and stop indicator 236. Start indicator 234 marks the location at which an initial positional stimulus for audio gauge 232 was detected and stop indicator 236 marks the location at which audio gauge 232 ceased while being dynamically adjusted. In one embodiment, audio gauges cease being dynamically adjusted as a result of audio input ceasing or falling below a minimum threshold level. Since, in FIG. 2A, the positional stimulus associated with audio gauge 232 is detected at a point located on electronic document 130 (indicated by start indicator 234), audio gauge 232 is subsequently generated on electronic document 130. In one embodiment, audio gauges are rendered semi-transparently, so that electronic documents located underneath, such as electronic document 130, remain visible. Audio gauges may graphically display the recorded audio waveform or segments of speech and silence.

Audio recorded according to the methods described herein may be played back or replayed in any of a number of ways. In one embodiment, recorded audio is replayed when control unit 150 detects a positional stimulus indicating a location on, or substantially close to, the start indicator of the associated audio gauge. In another embodiment, recorded audio is replayed when control unit 150 detects a positional stimulus indicating a location on, or substantially close to, any part of the associated audio gauge or electronic document or when the user presses a button as described above.

Audio gauges may also include a replay progress indicator such as progress puck 233. In one embodiment, as recorded audio is replayed, progress puck 233 moves along audio gauge 232 so as to indicate both the amount of recorded audio replayed as well as the amount of recorded audio remaining to be replayed. In FIG. 2A, progress puck 233 indicates that approximately 50% of the recorded audio associated with audio gauge 232 has been replayed. In other embodiments, progress indicators may take other forms including various geometric shapes or variations in color that progress along audio gauge 232. In one embodiment, replay of the recorded audio continues while a positional stimulus is detected that indicates a location on or substantially close to stop indicator 236, or until all previously recorded audio associated with the audio gauge has been replayed. Audio gauges may optionally include a "pause" indicator that, when selected, temporarily suspends recording or playback, and a "resume" indicator that resumes recording or playback after being paused.

Reference markers may also be utilized to enhance understanding of recorded audio content. FIG. 2B illustrates an exemplary audio gauge including reference markers. Referring to FIG. 2B, audio gauge 242 includes start and stop indicators 244 and 246 and is displayed upon display device 100 at a location below, electronic document 140. Note that audio gauge 242 may be overlayed on electronic document 140. Reference markers 232 and 234 graphically connect audio gauge 242 with electronic document 140. Reference markers 232 and 234 extend from time-dependent locations on audio gauge 242 to user-specified locations within electronic document 140. In one embodiment, reference markers 232 and 234 are rendered semi-transparently to allow the contents of electronic document 140 to be visible through reference markers 232 and 234.

In an exemplary embodiment, reference markers 232 and 234 are generated on display device 100 while audio is being recorded by control unit 150. Recall that according to one embodiment, audio is recorded and an audio gauge 242 generated in response to the system (either control unit 150 or display device 100) detecting a positional stimulus. As audio continues to be recorded, the size of the corresponding audio gauge 242 is proportionally adjusted so as to reflect the amount of audio recorded. In one embodiment, if the system detects an additional positional stimulus indicating a location on or substantially close to an electronic document while audio gauge 242 is being adjusted (e.g., audio is being recorded), the system generates a reference marker connecting the end-point of the audio gauge 242 to that location indicated on the electronic document. In the case of audio gauge 242, reference marker 232 is initiated by a positional stimulus detected at time T1, whereas reference marker 234 is initiated by a positional stimulus detected at a later time T2. In one embodiment, during replay of the recorded audio, reference marker 232 is displayed upon display device 100 when the recorded audio reaches time T1 and reference marker 234 is displayed upon display device 100 when the recorded audio reaches time T2.

The location on an electronic document to which a reference marker is graphically connected may be represented by (x,y) coordinates in the case where an electronic document represents an image, or the location may be represented by a single coordinate in the case where an electronic document represents a linear document. Examples of linear documents may include a plain text document, a hypertext markup language (HTML) document, or some other markup language-based document including extensible markup language (XML) documents.

In one embodiment, if during audio recording the system detects an additional positional stimulus that is not located on or substantially close to an electronic document, control unit 150 generates an additional audio gauge rather than a reference marker. The additional audio gauge may be generated in a manner similar to the first audio gauge described above. In one embodiment, control unit 150 graphically connects multiple audio gauges in the order in which they were generated. Upon audio replay, control unit 150 may sequentially replay the recorded audio in the chronological order that the audio was recorded. In one embodiment, one or more progress indicators may be utilized to display the amount of audio played with respect to each audio gauge. In another embodiment, a single progress indicator that sequentially travels from one audio gauge to another corresponding to the order of audio replay may be used.

In one embodiment, objects such as audio gauges, reference markers, electronic document thumbnails and icons may be repositioned individually or as a group, anywhere on display device 100 using conventional "drag" operations.

In another embodiment, neither the audio gauges nor the reference markers are displayed as recording occurs. However, a datafile is increased that includes locations of the referenced documents and timestamps for when the reference occurred. Details on such a data file are described in more detail below.

In one embodiment, the user speaking is recorded along with their "deictic" gestures (e.g., references to objects). In one embodiment, an interface includes a number of objects are displayed on the screen. In such a case, recording begins either when the user presses a "record" button or when the system detects the start of speech through its microphone. Whenever a user touches an object's graphical representation on a touchscreen, a time-stamped event is recorded. Recording ends either when the user presses a "stop" button or when the system detects end of speech. When playing back this message, the system plays the audio, and at the appropriate times displays the referred-to objects.

In one embodiment, the system allows the user to record an audio narrative and make references to digital photographs uploaded from a camera simply by touching them on a touchscreen. The resulting presentation is stored using the multimedia description languages SMIL and RealPix, allowing for playback using the widely distributed RealPlayer. A simple extension allows the user to refer to points or regions within objects, by monitoring the locations "touched" more precisely. On playback, such gestures can become highlighting strokes overlaid on images or documents.

Multimedia Chronicles

A multimedia chronicle is a particular type of audio narrative that includes a singular narration thread and one or more references to various types of electronic documents. Multiple sub-chronicles, each containing a singular narration thread, may be combined to form a larger multimedia chronicle. Within a multimedia chronicle it is possible for one or more persons to describe various types of electronic documents including, for example, but not limited to, a Web page with hyperlinks, a slide show containing audio narration, a text document containing text annotations, a scanned document image, a word processor document, a presentation, etc. The references may refer to the contents of the entire electronic document or to a specific area within the electronic document. A linear ordering of sub-chronicles may also be specified allowing them to be played back in a default order.

Figure 3A:
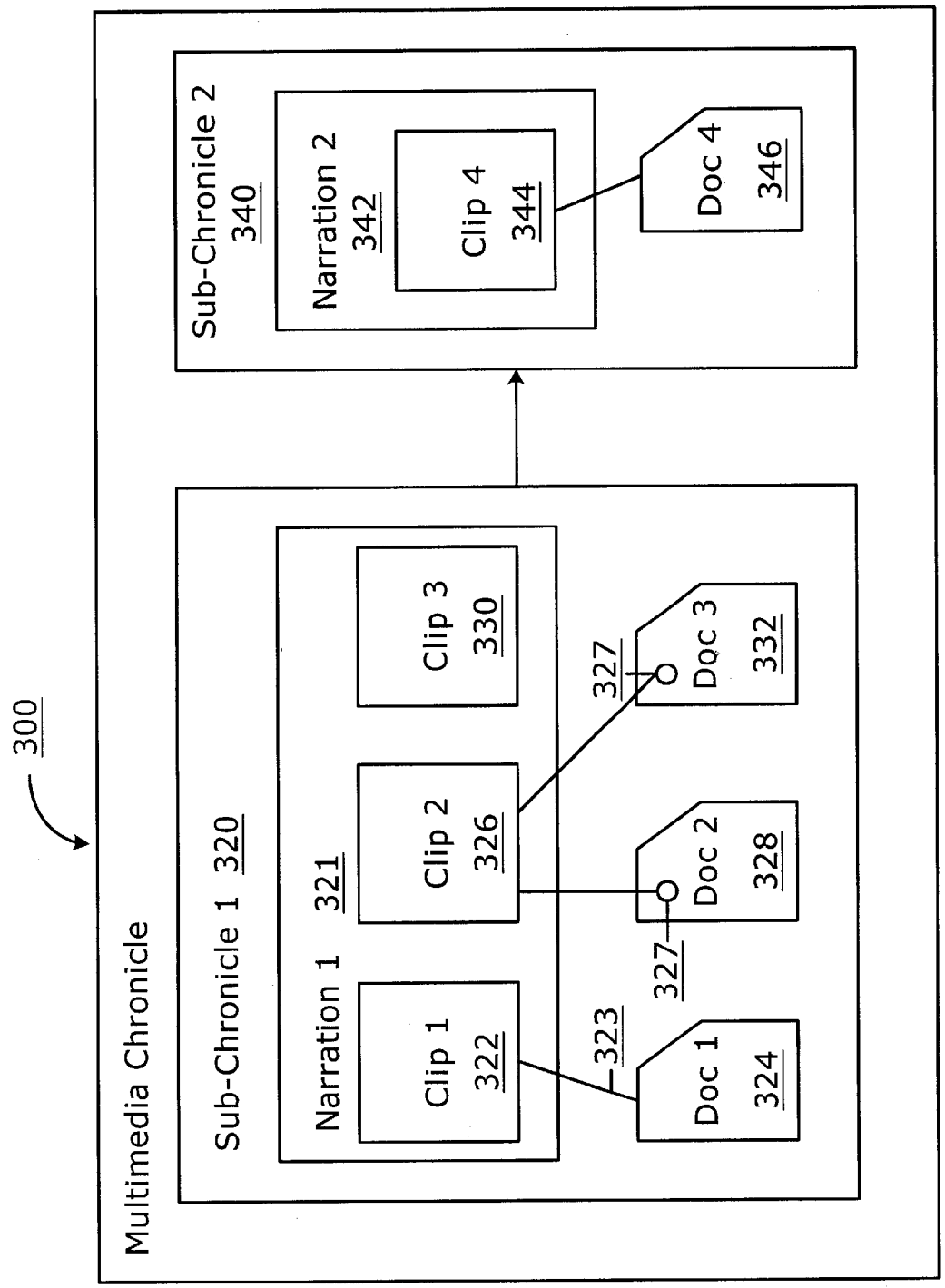
FIG. 3A is a block diagram illustrating one embodiment of an exemplary multimedia chronicle.

FIG. 3A illustrates an exemplary multimedia chronicle. Referring to FIG. 3A, multimedia chronicle 300 includes first sub-chronicle 320 and second sub-chronicle 340. First sub-chronicle 320 comprises narration thread 321, and second sub-chronicle 340 comprises narration thread 342. In one embodiment, a narration thread is a stream of recorded audio that follows a given theme or discussion topic. In FIG. 3A, narration thread 321 is segmented into an ordered list of three separate audio clips, and narration thread 342 of sub-chronicle 340 comprises only single audio clip 344.

Each narration thread may contain one or more references to various electronic documents. For example, narration thread 321 contains one reference to each of electronic documents 324, 328 and 332, for a total of three references. Narration thread 342, however, contains only a single reference to single electronic document 346. Each audio clip within a narration thread may contain any number of references to any number of electronic documents, or no references at all. For example, audio clip 322 contains a single reference to electronic document 324, audio clip 326 contains one reference to electronic document 328 and one reference to electronic document 332, and audio clip 330 does not contain any references.

Each reference may either indicate an entire electronic document, as shown by reference point 323, or optionally indicate a specific area within an electronic document, as shown by reference points 327. The coordinates representing such reference points may have different interpretations depending upon the type of electronic document they are referencing. For example, if the electronic document is an image, coordinates of the reference point may be absolute pixel coordinates. If the document is a web page, however, coordinates of the reference point may be a character position within an HTML file. In the case of a document stored as a series of page images, for instance, a scanned document, the reference point may be a page number plus (x,y) coordinates. Alternatively, if a document is represented by a layout language such as Postscript or PDF (Portable Document Format), the coordinate can be a character position within the file. Then, upon rendering (during playback), this can be translated to a position on the screen.

The multimedia chronicle described above with respect to FIG. 3A may be represented by one or more markup languages including XML and HTML. FIG. 3B illustrates one embodiment of an XML representation for the multimedia chronicle shown in FIG. 3A.

Multimedia Messaging

Electronic mail (email) software usually provides an option by which an original email message may be included in a reply. Typically an email reply can be interspersed among the lines of the original message, or it can be appended or prepended to the original message as a single block. Multimedia chronicles may similarly be transferred over a network using a variety of readily available email applications known in the art.

Figure 4A:
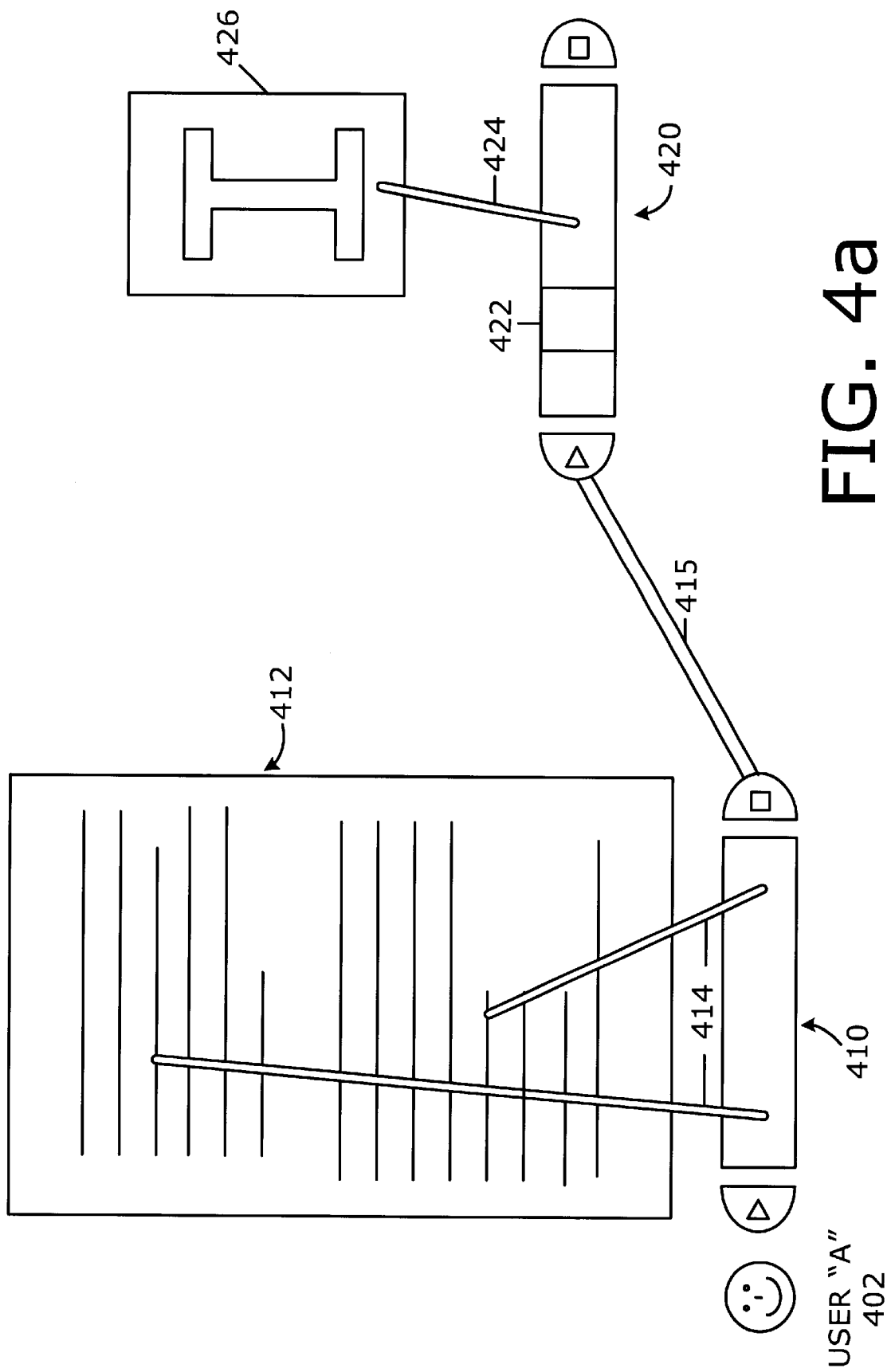
FIG. 4A illustrates another embodiment of a multimedia chronicle.

FIG. 4A illustrates one embodiment of a multimedia chronicle. Referring to FIG. 4A, electronic document 412 and icon 426 are shown along with two audio gauges 410 and 420 and various reference markers. Electronic document 412 represents a word processing document shown in a reduced "thumbnail" size, whereas icon 426 represents an iconized format of a similar word processing document in which the text of the document is not displayed. In one embodiment, the full text of the electronic document, represented by icon 426, may be viewed by "clicking" or selecting icon 426 with a cursor control input device such as a mouse. Audio gauge 410 is shown graphically connected to electronic document 412 by reference markers 414, whereas audio gauge 420 is shown graphically connected to icon 426 by reference marker 424.

Additionally, audio gauges 410 and 420 are shown connected together by connector 415 which indicates that the two audio clips represented by audio gauges 410 and 420 are chronically adjacent (420 was recorded subsequent to 410). The connection may only indicate chronological ordering. However, a user can place gauges anywhere on the display. In one embodiment, audio clips recorded by the same user are considered to be related. In one embodiment the face image of the user who recorded the audio is displayed beside the corresponding audio gauge(s). In FIG. 4A, face image 402 represents user "A" who recorded the audio corresponding to audio gauges 410 and 420. In one embodiment, face images may be captured during recording by a video camera connected to the system, whereas in another embodiment, face images may be accessed from a database.

Once the multimedia chronicle illustrated by FIG. 4A is created, user "A" may send the multimedia chronicle to another user via electronic mail. In one embodiment, in order to send the multimedia chronicle to another user, an XML representation of the multimedia chronicle (such as that shown in FIG. 3B) is created. The XML representation references the various electronic documents and audio clips by way of URL addresses that point to their stored location (s). In one embodiment, the contents of a multimedia chronicle may be transferred to and stored on a designated web server, whereas in another embodiment, the contents may be stored locally on the user's personal computer. In an intranet environment, for example, contents of a multimedia chronicle may reside upon a user's personal computer and yet be accessed by others through a web interface. Once an XML representation of the multimedia chronicle is created, a unique URL pointing to the XML representation is subsequently emailed to another user, say user "B".

Upon receipt of the email containing the XML URL, user "B" may have several viewing options. In one embodiment, upon accessing the URL containing the XML representation, the XML representation is parsed to create and play the message if user "B" has an appropriate application to view the XML representation. In another embodiment, where user "B" does not have an appropriate application to view the XML representation, the message may alternatively be displayed as a standard HTML-based web page. That is, the XML representation containing individual URLs pointing to one or more electronic documents and audio clips is displayed as a list of individual hyperlinks rather than a chronicle. In yet another embodiment, the message may be translated into a synchronized multimedia integration language (SMIL) formatted file as specified by the World-Wide Web (WWW) consortium. Using a "viewer" such as Real-Player G2 from Real Networks, Inc., user "B" may view the SMIL message as a slideshow in which the audio clips and corresponding electronic documents and references are simultaneously presented in an order, such as the order in which they were recorded.

Access to the received multimedia chronicle message may optionally be limited by access control functions. In one embodiment, a user may only retrieve the message if he or she is the sender or named recipient. In another embodiment, users may be required to authenticate themselves with, for example, a user name and/or password prior to accessing the message.

Figure 4B:
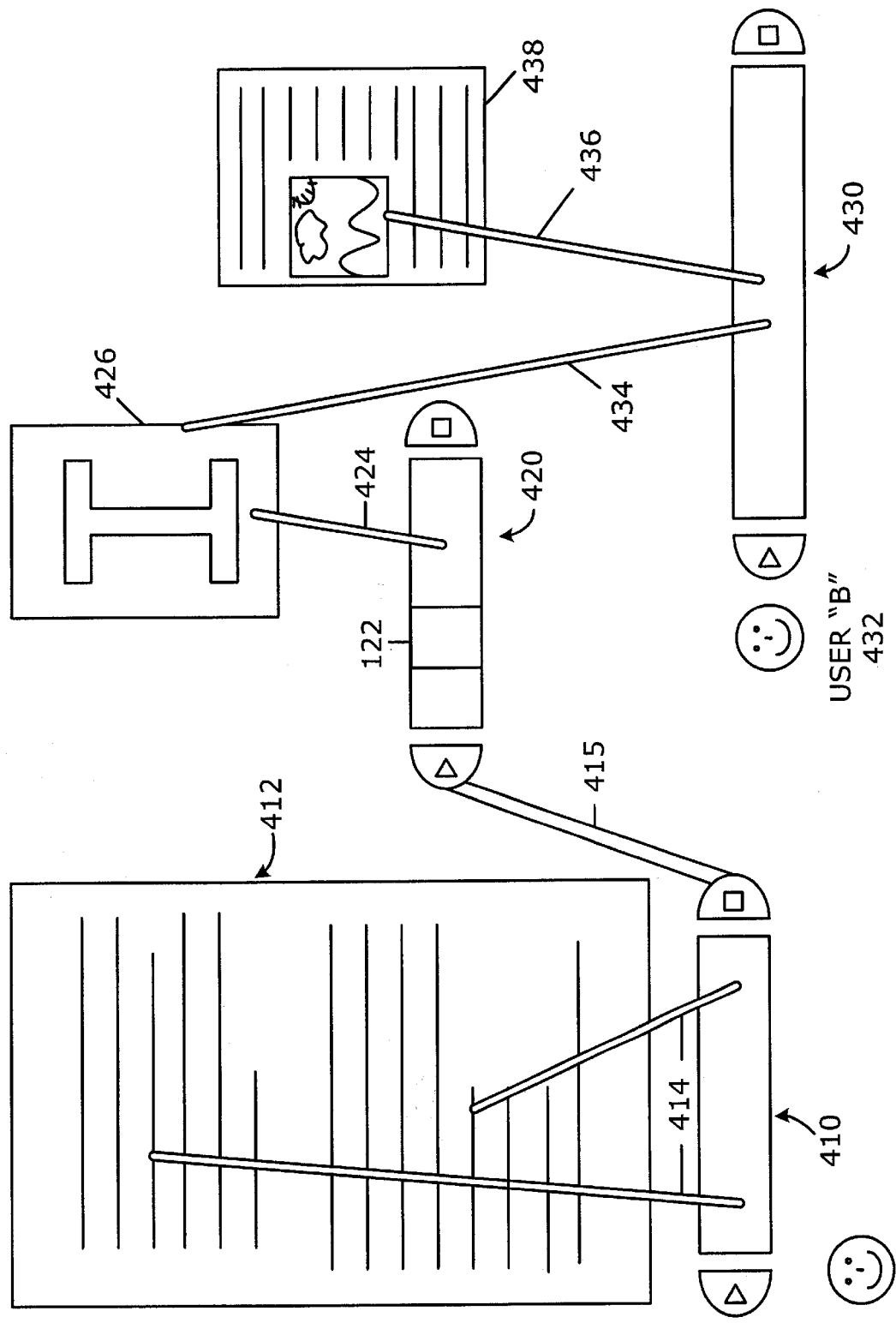
FIG. 4B illustrates one embodiment of a reply to an electronic mail message containing the multimedia chronicle shown in FIG. 4A.

Once user "B" receives the message, user "B" may reply by adding additional electronic documents and audio clips (represented by audio gauges). FIG. 4B illustrates one embodiment of a reply to an electronic mail message containing the multimedia chronicle shown in FIG. 4A. In addition to the items shown in FIG. 4A, FIG. 4B additionally includes a third audio gauge 430 containing reference markers 434 and 436. Audio gauge 430 represents an audio clip that was added by user "B" to the original message shown in FIG. 4A. In one embodiment audio gauge 430, created by user "B", is displayed in a different color than audio gauges 410 and 420, created by user "A". Reference marker 436 graphically connects audio gauge 430 with newly added electronic document 438, whereas reference marker 434 graphically connects audio gauge 430 with previously displayed icon 426. User "B" can position gauge anywhere on screen, but lines shown connecting elements on the display indicate chronological ordering.

Once user "B" enters a response to the message or multimedia chronicle received from user "A", user "B" may send the reply back to user "A" or to some other user or group of users. Assuming the reply is sent back to user "A", in one embodiment, user "A" first hears the additions made to user "A's" message by user "B". That is, upon receipt, user "A" hears the recorded audio represented by audio gauge 430.

Figure 4C:
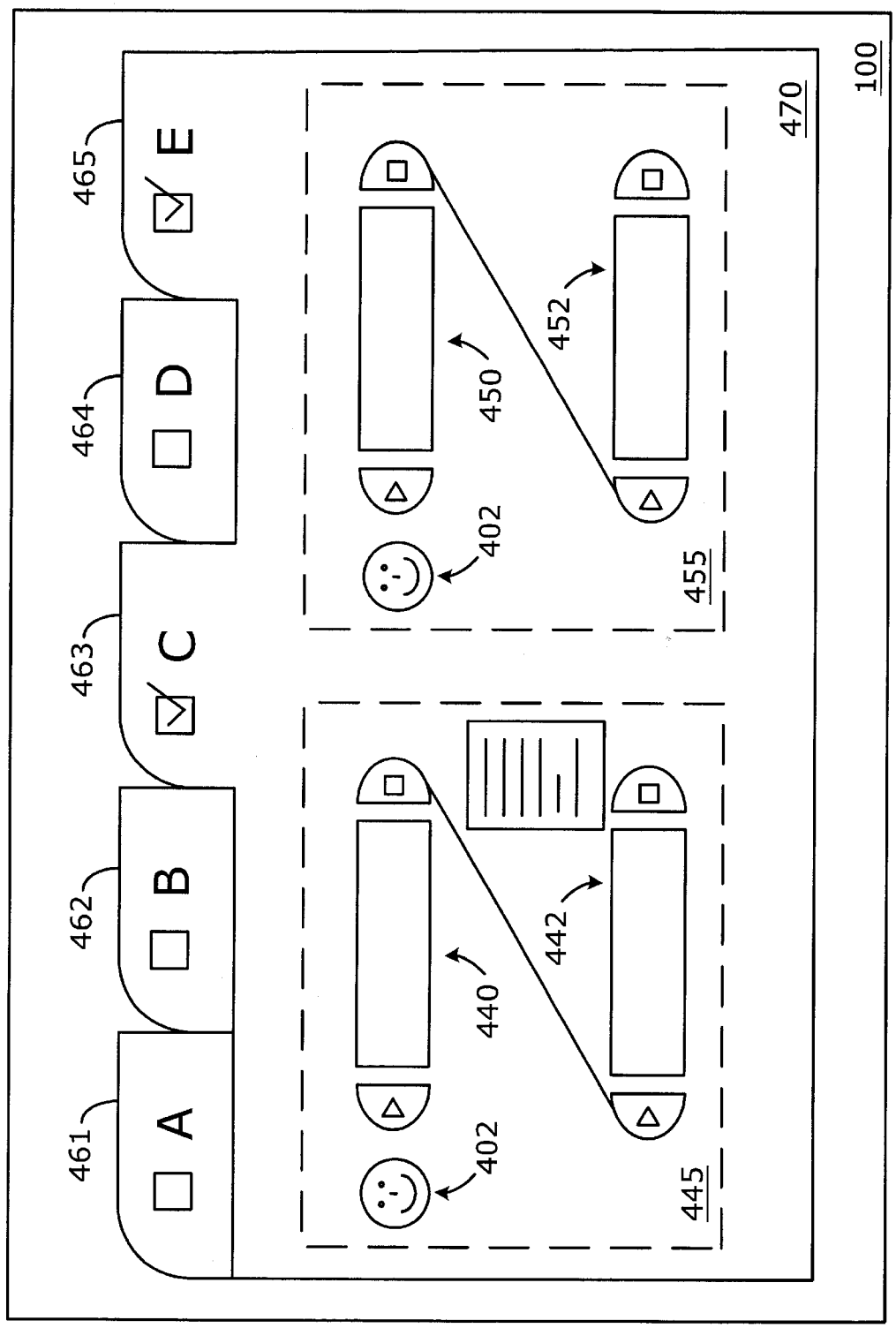
FIG. 4C illustrates one embodiment of a multimedia chronicle messaging interface that allows segments of the multimedia chronicle to be selectively viewed.

In one embodiment, a multimedia chronicle message may be displayed with separate user's additions or replies being selectively viewable. FIG. 4C illustrates one embodiment of a multimedia chronicle messaging interface that allows segments of the multimedia chronicle to be selectively viewed. Referring to FIG. 4C, messaging interface 465 is displayed upon display device 100. Messaging interface 470 includes audio gauges 440, 442, 450, and 452, faces 402, and tabs 460–465. Audio gauges 440 and 442 represent audio previously recorded by end user "A" (face 402), and audio gauges 450 and 452 represent audio currently being composed by end user "A". In one embodiment, each of tabs 460–465 is individually selectable and each may represent one segment of an ongoing conversation between user "A" and another user, such as user "B". For example, when selected, tab 461 displays an original message from user "A" to user "B". Tab 462 on the other hand displays user "B's" reply to user "A's" original message when selected. Likewise, when selected, tab 463 displays user "A's" reply (shown by bounding box 445) to user "B's" reply. In one embodiment, any number of past messages or replies may be selectively viewed while a new message or reply is being composed. For example, user "A's" reply (associated with tab 463 and shown by bounding box 445) is concurrently displayed with a message that user "A" is in the process of composing (associated with tab 465 and shown by bounding box 455). Once user "A" completes the message currently being composed, user "A" electronically mails the message in the manner described above. Tabs 460–465 may be labeled with the time of creation of the corresponding messages, as well as the names of the originators of the messages.

Three-Dimensional Walkthroughs

A method and apparatus for recording and playback of multidimensional walkthrough narratives is disclosed. A three dimensional modeling language is used to automatically create a three-dimensional environment using pre-existing electronic documents. The objects are 3D. In one embodiment, they are shown on a 2D display such as display device 100. In another embodiment, a 3D display (e.g., head-mounted glasses) can be used.

A first user, or author, may navigate throughout the three-dimensional environment while simultaneously recording the path taken and any accompanying audio input. In one of two playback modes, a second user can be shown a "walkthrough" of the three-dimensional scene corresponding to the path taken by the author. In the other playback mode, a second user is free to navigate the three-dimensional world while the author's path is displayed.

Generation

Figure 5:
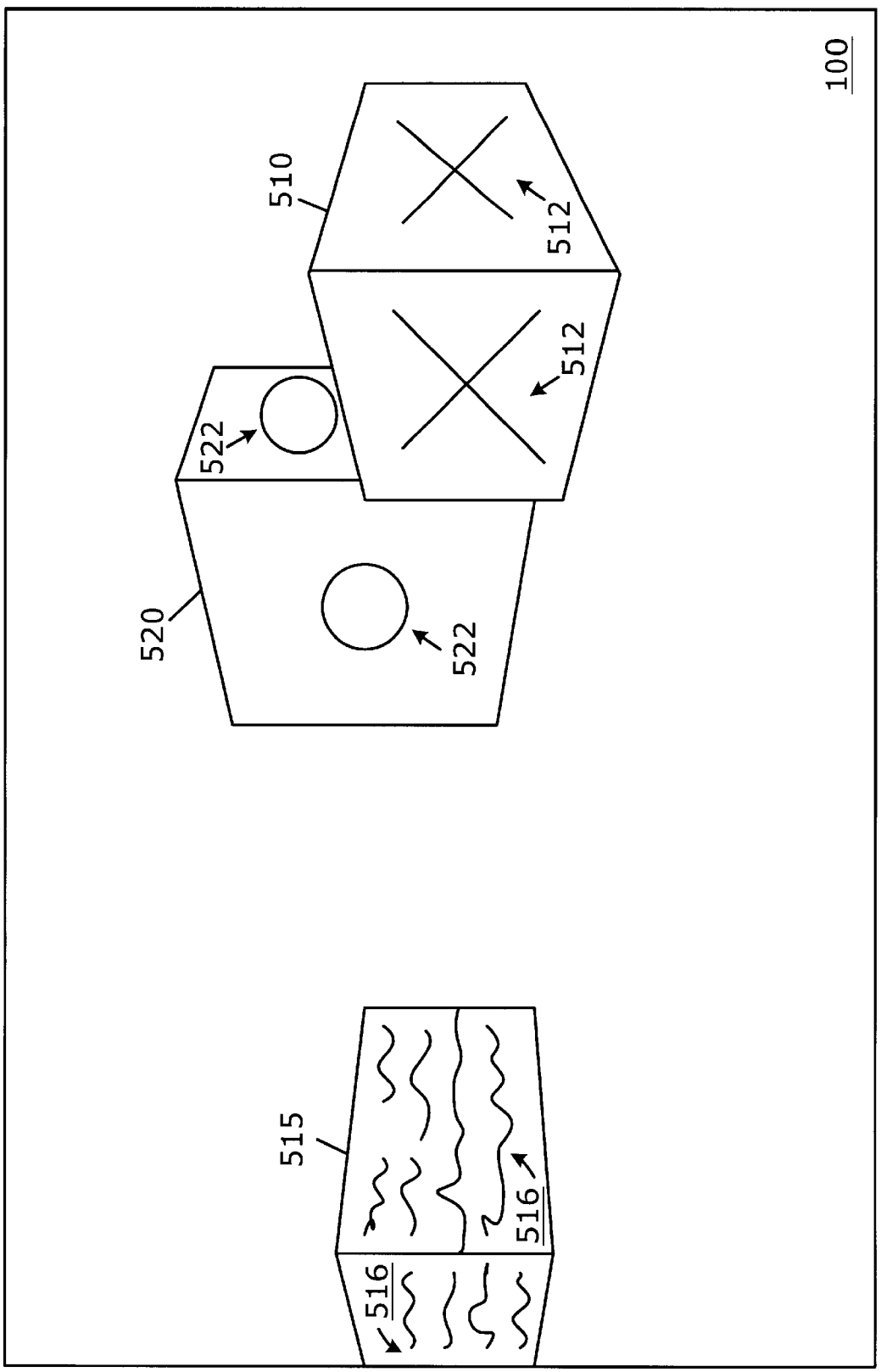
FIG. 5 illustrates one embodiment of a three-dimensional environment.

FIG. 5 illustrates one embodiment of a three-dimensional environment. Referring to FIG. 5, display device 100 is shown displaying a three-dimensional environment or world containing cubes 510, 515 and 520. In one embodiment, the three-dimensional environment is empty except for cubes 510, 515 and 520. In another embodiment, the three-dimensional environment may contain additional aesthetic or substantive features as may be desired.

Cubes 510, 515 and 520 are depicted in FIG. 5 as being three-dimensional and set within the three-dimensional world. In other embodiments, cubes 510, 515 and 520 may be replaced by other figures of varying shape. In one embodiment, for example, the cubes may be replaced by three-dimensional spheres, whereas in another embodiment, the cubes may be replaced by three-dimensional cylinders or rectangular prisms. Figures of varying size and shape may be used without departing from the spirit and scope of the invention.

FIG. 5 additionally shows electronic documents 512, 516 and 522 displayed upon cubes 510, 515 and 520 respectively. In a three-dimensional environment, electronic documents 512, 516 and 522 appear as being superimposed upon cubes 510, 515 and 520. In one embodiment, electronic documents 512 and 522 represent digital photographs, whereas electronic document 516 represents a word processing document. Additional forms of electronic documents may include without limitation, digitized audio and video, electronic spreadsheets, electronic databases, hypertext markup language and web documents, and electronic mail. Electronic documents 512, 516 and 522 may represent similar types of content and media not described herein.

In one embodiment, a two-dimensional reduced-size "thumbnail" image is created and superimposed upon a three-dimensionally rendered figure such as cubes 510, 515 and 520. In such a manner, a two-dimensional image can be converted into a three-dimensional representation of that image. In one embodiment, cubes 510, 515 and 520 are defined through extended markup language (XML). In another embodiment a three-dimensional modeling language such as VRML, 3DML, and X3D may be used.

As each three-dimensional figure is generated, it is displayed within the three-dimensional environment. In one embodiment, each three-dimensional figure is randomly placed or displayed within the three-dimensional environment as it is generated. In another embodiment, each three-dimensional figure is displayed with respect to other preexisting three-dimensional figures according to a placement scheme. In one embodiment, placement schemes are based upon characteristics of the electronic documents contained within the three-dimensional figures. Examples of placement schemes include, without limitation, time of creation, content, and media type. In yet another embodiment, the three-dimensional figures are displayed at a pre-determined fixed distance from one another. By displaying the three-dimensional figures according to various placement schemes, it is possible for an author to group or cluster certain types of information together to help guide user understanding. In one embodiment, the user, or one who navigates the three-dimensional environment after creation, is able to rearrange the three-dimensional figures according to their own organizational preference.

Recording

Once the three-dimensional environment is created, it may be navigated by a user. In one embodiment, navigation is possible through the use of a readily available "player" application including a virtual reality modeling language (VRML) viewer such as Cosmo Player available from Silicon Graphics, Inc., of Mountain View, Calif., or a three dimensional modeling language (3DML) viewer such as Flatland Rover available from Flatland Online Inc., of San Francisco, Calif. In one embodiment, a special class of user, called an author, is able to navigate through the three-dimensional environment while the author's virtual movements are recorded. The term "recording" as used herein is meant to describe the process of retaining navigational and audio input as generated by a user with respect to the three-dimensional environment.

In an exemplary embodiment, an author navigates through a three-dimensional environment while a processing device, such as processor 102, causes the author's movements to be recorded. Any audio narrated by the author while navigating is also recorded, thus creating a walk-through. In one embodiment, as the audio is recorded, it is segmented so as to divide the audio into multiple audio clips of varying duration according to a segmenting scheme. The audio may be recorded as described above. Thus, in one embodiment, a 2D multimedia chronicle is created and viewed as a 3D walkthrough, and vice versa. Similarly, in another embodiment, video content may be recorded and segmented in lieu of audio. As the author navigates toward a three-dimensional figure, the electronic document superimposed upon the figure appears larger to the author. By approaching the figure, the author may take a closer look at the figure or electronic document contained thereon. If so equipped, the player application may also provide the author the opportunity to view the electronic document in a separate, full-screen display, in another part of the display, or in a dedicated portion of the display overlaying the walkthrough.

Figure 6:
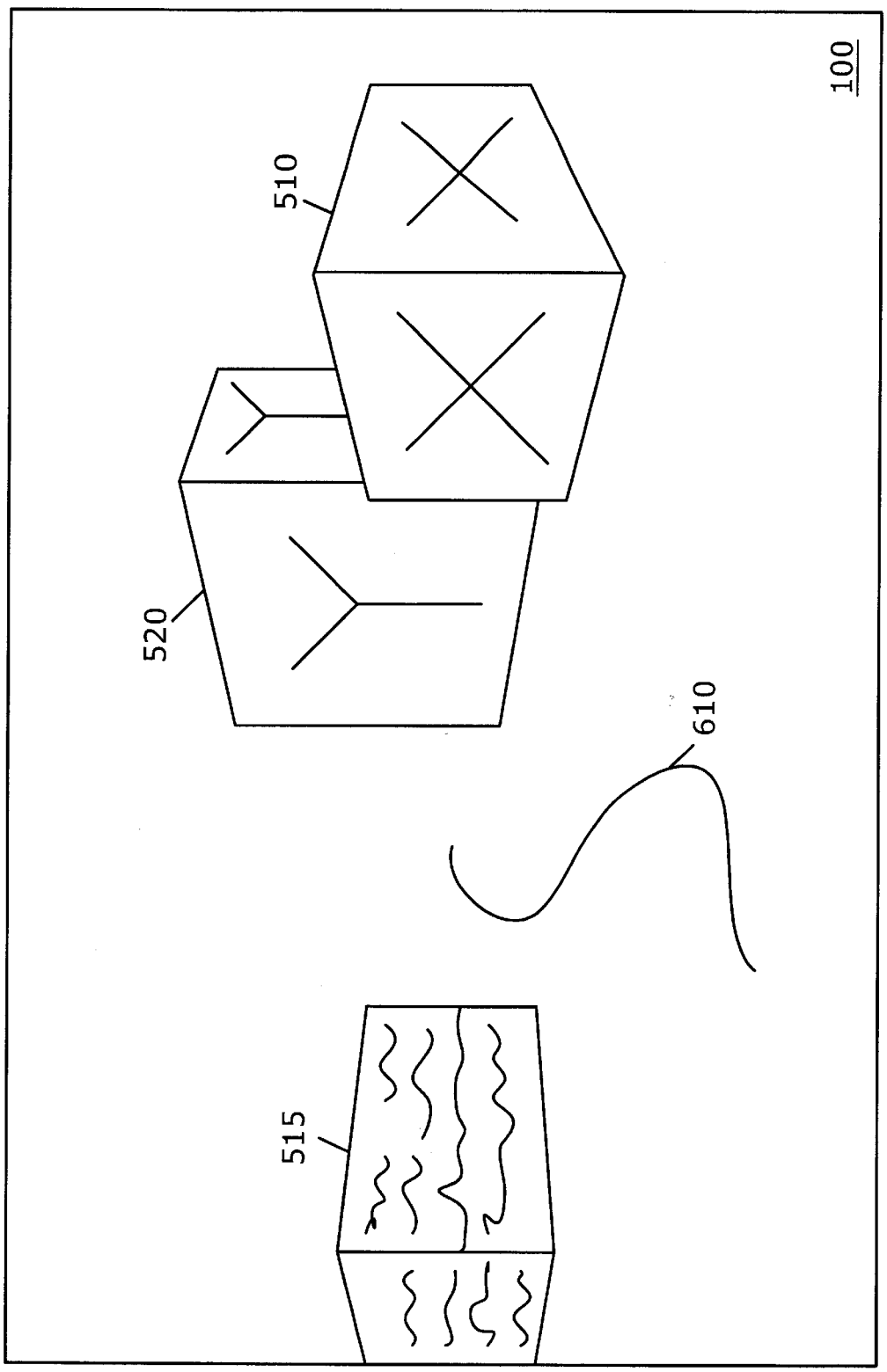
FIG. 6 illustrates one embodiment of a three-dimensional environment showing a path.

FIG. 6 illustrates a three-dimensional environment showing a recorded path according to one embodiment of the present invention. Referring to FIG. 6, display device 100 is shown displaying a three-dimensional environment containing three-dimensional cubes 510, 515 and 520, and path 610. Path 610 represents a path through which an author has navigated. Path 610 is shown as a line, but in other embodiments may take the form of various other shapes. In one embodiment, path 610 is displayed in a single color, while in other embodiments, path 610 may be displayed in multiple colors, or may appear semi-transparent.

Figure 7:
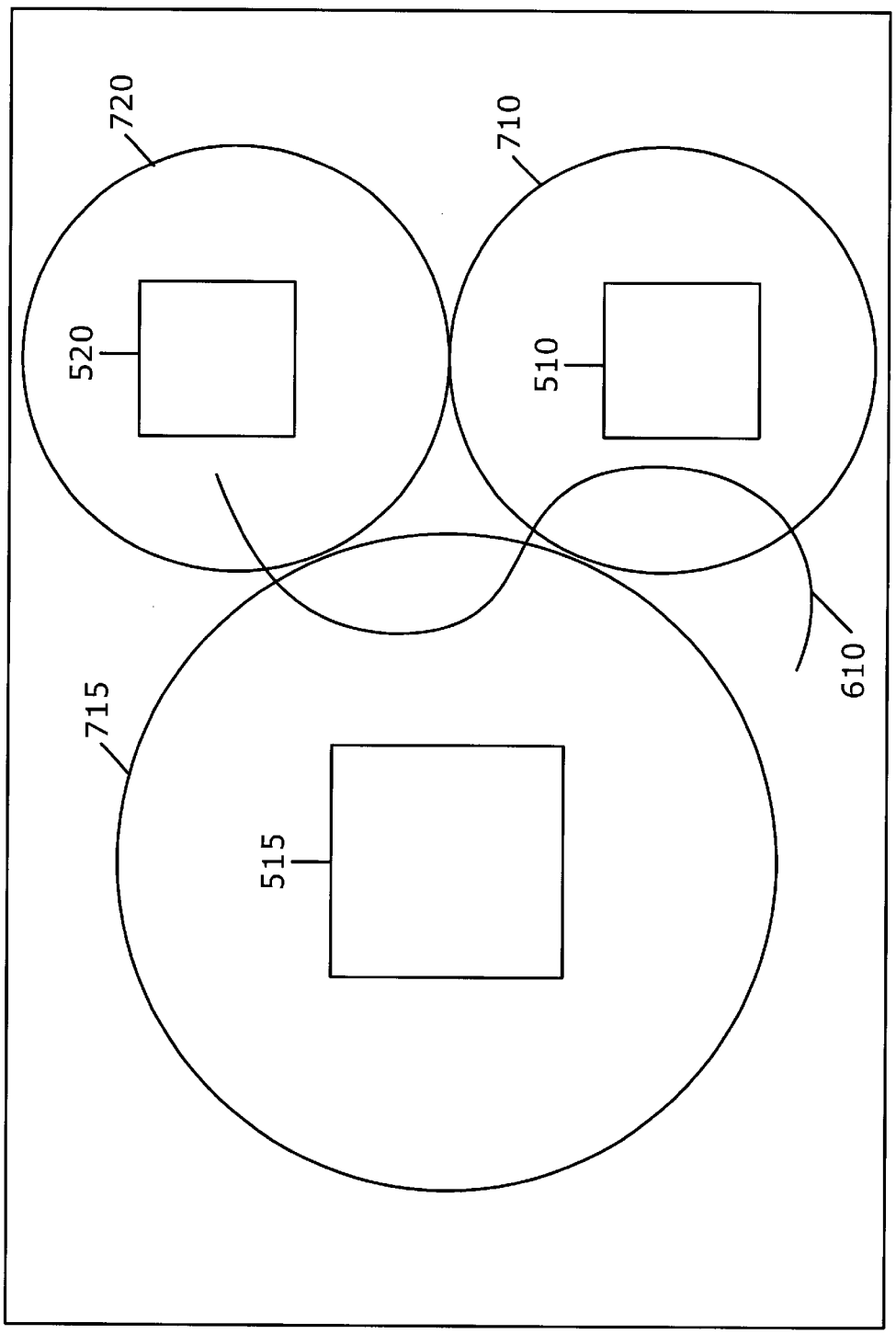
FIG. 7 illustrates a two-dimensional top view of the three-dimensional environment of FIG. 6.

FIG. 7 illustrates one embodiment of a two-dimensional top view of the three-dimensional environment shown in FIG. 6. Referring to FIG. 7, three-dimensional cubes 510, 515 and 520 are shown within proximity indicators 710, 715 and 720 respectively. In one embodiment, each of proximity indicators 710, 715 and 720 represent a bounded area that is associated with a particular media clip or segment. In one embodiment, the media clip contains audio content, whereas in another embodiment, the media clip contains video content.

In one embodiment, each proximity indicator is associated with an audio or a video segment that presumably relates to the three-dimensional figure bounded by the proximity indicator. In one embodiment, multiple three-dimensional figures may exist within a single proximity indicator, and in another embodiment, multiple proximity indicators may bound a single three-dimensional figure.

Playback

A user of the three-dimensional multimedia narrative described herein can choose whether to pursue playback of the recorded three-dimensional walkthrough in passive or active modes.

According to one embodiment, in a passive mode, the playback is movie-like in that the user is shown a three-dimensional walkthrough corresponding to the path taken by the author when the walkthrough was recorded. In one embodiment, audio narration that was recorded by the author is also played while in a passive mode. As documents are passed in a passive mode, the viewing user can also view the source of the documents in a separate window or viewing application.

In an active playback mode, the user is free to navigate the three-dimensional environment without being limited by the author's previously taken path. According to one embodiment of the present invention, while in active mode, the author's path remains visible as the user navigates through the three-dimensional environment. In yet another embodiment, segmented audio recorded by the author is played as the user approaches a related three-dimensional figure. Referring once again to FIGS. 6 and 7, as a user navigates along the author's path 610 and approaches cube 510, the user hears an audio segment recorded by the author while the author was within proximity indicator 710. In one embodiment, the audio would not be played until the user navigated to within the area bounded by proximity indicator 710. In another embodiment, the loudness of the audio may increase as the user approaches cube 510. Additionally, stereo effects may be used to locate audio within three-dimensional space corresponding to the position of the cube in the virtual three-dimensional environment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

I claim:

1. A method for generating multimedia representation on a display device comprising:

displaying a representation of an electronic document having a first location upon the display device;

receiving an audio input stream;

displaying a first audio gauge with a graphical connection to the electronic document location upon the display device;

dynamically adjusting a length of the first audio gauge to be proportional in size to an amount of audio recorded;

receiving a second positional stimulus indicating a second location on the display device, and generating a reference marker connecting an end-point of the first audio gauge to the second location indicated by the second positional stimulus, wherein the reference marker is generated only if the second location on the display device is occupied by an electronic document.

2. The method of claim 1, further comprising:

displaying a second audio gauge located at a second location the second audio gate having a graphical connection to either the first audio gate or a second electronic document; and dynamically adjusting the second audio gauge to be proportional in size to an amount of audio recorded after the second audio gauge is displayed.

3. The method of claim 2, wherein when the second audio gauge is displayed, the first audio gauge terminates being dynamically updated.

4. The method of claim 2, wherein the graphical connection indicates a chronological order of generation.

5. The method of claim 1, wherein receiving of the audio stream is initiated upon receiving a first positional stimulus corresponding to the first location upon the display device.

6. The method of claim 1, wherein recording of the audio stream is initiated upon detecting audio input above a predetermined threshold level.

7. The method of claim 1, wherein the first audio gauge is rendered semi-transparently so as to allow documents displayed underneath the first audio gauge to remain visible through the first audio gauge.

8. The method of claim 1, wherein the first audio gauge is substantially linear in shape.

9. The method of claim 8, wherein the first audio gauge includes start and stop indicators.

10. The method of claim 1, wherein the reference marker is semi-transparently rendered.

11. The method of claim 1, wherein an image associated with the source of the audio input stream is displayed.

12. The method of claim 11, wherein the image is accessed from a database.

13. The method of claim 11, wherein the image is captured by a video capture device.

14. An article of manufacture comprising a machine readable medium having instructions stored thereon, wherein when the instructions are executed by a processor, the instructions cause the processor to:
  cause a representation of an electronic document to be displayed at a first location upon a display device;
  receive a first audio input stream;
  display a first audio gauge with a graphical connection to the electronic document upon the display device; and dynamically adjust a length of the first audio gauge to be proportional in size to an amount of audio recorded;
  receive a second positional stimulus indicating a second location on the display device, and
  generate a reference marker connecting an end-point of the first audio gauge to the second location indicated by the second positional stimulus, wherein the reference marker is generated only if the second location on the display device is occupied by an electronic document.

15. The method of claim 14, further comprising:
  receiving at least one additional positional stimulus indicating additional locations upon the display device;
  terminating recording of the first audio stream and initiating recording of at least one additional audio stream upon receiving the at least one additional positional stimulus;
  displaying at least one additional audio gauge upon receiving the at least one additional positional stimulus; and
  dynamically adjusting the at least one additional audio gauge to indicate an amount of audio recorded after receiving the at least one additional positional stimulus.

16. The method of claim 15, wherein recording of each of the at least one additional audio streams is terminated upon receiving a subsequent positional stimulus.

17. The method of claim 15, wherein recording of each of the at least one additional audio streams is terminated upon receiving an amount of audio that is below a predetermined threshold level.

18. A method for generating a multimedia representation comprising:
  receiving a first positional stimulus indicating a first location upon a display device;
  initiating recording of an audio input stream;
  displaying a first audio gauge at the first location upon the display device;
  receiving a second positional stimulus indicating a second location upon the display device;
  generating a reference marker graphically connecting the audio gauge to the second location;
  representing the audio input stream by a first address pointing to a storage location of the audio input stream;
  representing the first audio gauge by a second address pointing to a storage location of the first audio gauge;
  generating a first graphical representation of the first and second addresses;
  representing the first graphical representation by a third address pointing to a storage location of the first graphical representation; and electronically transferring the third address.

19. The method of claim 18, wherein the second location upon the display device corresponds to an electronic document displayed upon the display device.

20. The method of claim 19, wherein the multimedia representation may be generated in a synchronized multimedia integration language (SMIL) so as to allow playback as a slideshow.

21. The method of claim 18, wherein at least one of the first and second addresses are uniform resource locator (URL) addresses.

22. The method of claim 18, wherein the first graphical representation is a hypertext markup language (HTML) representation.

23. The method of claim 18, wherein the first graphical representation is an extensible markup language (XML) representation.

24. An apparatus for generating multimedia representation on a display device comprising:
  means for displaying a representation of an electronic document having a first location upon the display device;
  means for receiving an audio input stream;
  means for displaying a first audio gauge with a graphical connection to the electronic document location upon the display device;
  means for dynamically adjusting a length of the first audio gauge to be proportional in size to an amount of audio recorded;
  means for receiving a second positional stimulus indicating a second location on the display device, and
  means for generating a reference marker connecting an end-point of the first audio gauge to the second location indicated by the second positional stimulus, wherein the reference marker is generated only if the second location on the display device is occupied by an electronic document.

25. The apparatus of claim 24, wherein the positional stimulus is received from at least one of a touch-screen, mouse, trackball, stylus, and pen.

26. The apparatus of claim 24, further comprising:
  means for displaying a second audio gauge located at a second location upon the display device, if a second positional stimulus indicating the second location is received; and
  means for dynamically adjusting the second audio gauge to be proportional in size to an amount of audio recorded after the second audio gauge is displayed.

27. The apparatus of claim 26, wherein when the second audio gauge is displayed, the first audio gauge terminates being dynamically updated.

28. The apparatus of claim 26, wherein the first and the second audio gauges are graphically connected together to show a chronological order of generation.

29. The apparatus of claim 24, wherein the first audio gauge is rendered semi-transparently so as to allow documents displayed underneath the first audio gauge to remain visible through the first audio gauge.

* * * * *